(12) United States Patent
Hare et al.

(10) Patent No.: US 6,880,389 B2
(45) Date of Patent: Apr. 19, 2005

(54) SOFTWARE SYNCHRONIZATION OF MULTIPLE SCANNING PROBES

(75) Inventors: Casey Patrick Hare, Santa Barbara, CA (US); Andrew Norman Erickson, Santa Barbara (CA)

(73) Assignee: Multiprobe, Inc., Santa Barbara, CA (US)

( * ) Notice: Subject to any disclaimer, the term of this patent is extended or adjusted under 35 U.S.C. 154(b) by 94 days.

(21) Appl. No.: 10/615,223

(22) Filed: Jul. 7, 2003

(65) Prior Publication Data

US 2004/0025578 A1 Feb. 12, 2004

Related U.S. Application Data

(60) Provisional application No. 60/394,414, filed on Jul. 8, 2002.

(51) Int. Cl.[7] .................................................. H01J 3/14
(52) U.S. Cl. ........................ 73/105; 250/307; 250/306
(58) Field of Search ........................... 73/105; 250/306, 250/307

(56) References Cited

U.S. PATENT DOCUMENTS

| | | | |
|---|---|---|---|
| 4,831,614 A | * | 5/1989 | Duerig et al. ................ 369/101 |
| 4,902,892 A | | 2/1990 | Okayama et al. |
| 4,924,091 A | | 5/1990 | Hansma et al. |
| 4,956,817 A | | 9/1990 | West et al. |
| 5,036,490 A | * | 7/1991 | Kajimura et al. ........... 369/126 |
| 6,028,305 A | * | 2/2000 | Minne et al. ................ 250/234 |
| 6,516,528 B1 | * | 2/2003 | Choo et al. .................... 33/552 |
| 6,583,411 B1 | * | 6/2003 | Altmann et al. ............. 250/306 |

* cited by examiner

*Primary Examiner*—Michael Cygan
(74) *Attorney, Agent, or Firm*—Felix L. Fischer

(57) ABSTRACT

A method and apparatus for scanning multiple scanning probe microscopes in close proximity, to scan overlapping scan areas at the same time while avoiding collision employs a control system providing drive signals to a first Atomic Force Microscope (AFM) and calculated drive signals to additional AFMs based on the first drive signals and the relative position of the additional AFMs to the first AFM for consistent spaced motion. Scanning and Failure Analysis (FA) probing of multiple feature of interest using multiple APMs allows for reduced time for locating FA features to set up measurements.

15 Claims, 13 Drawing Sheets

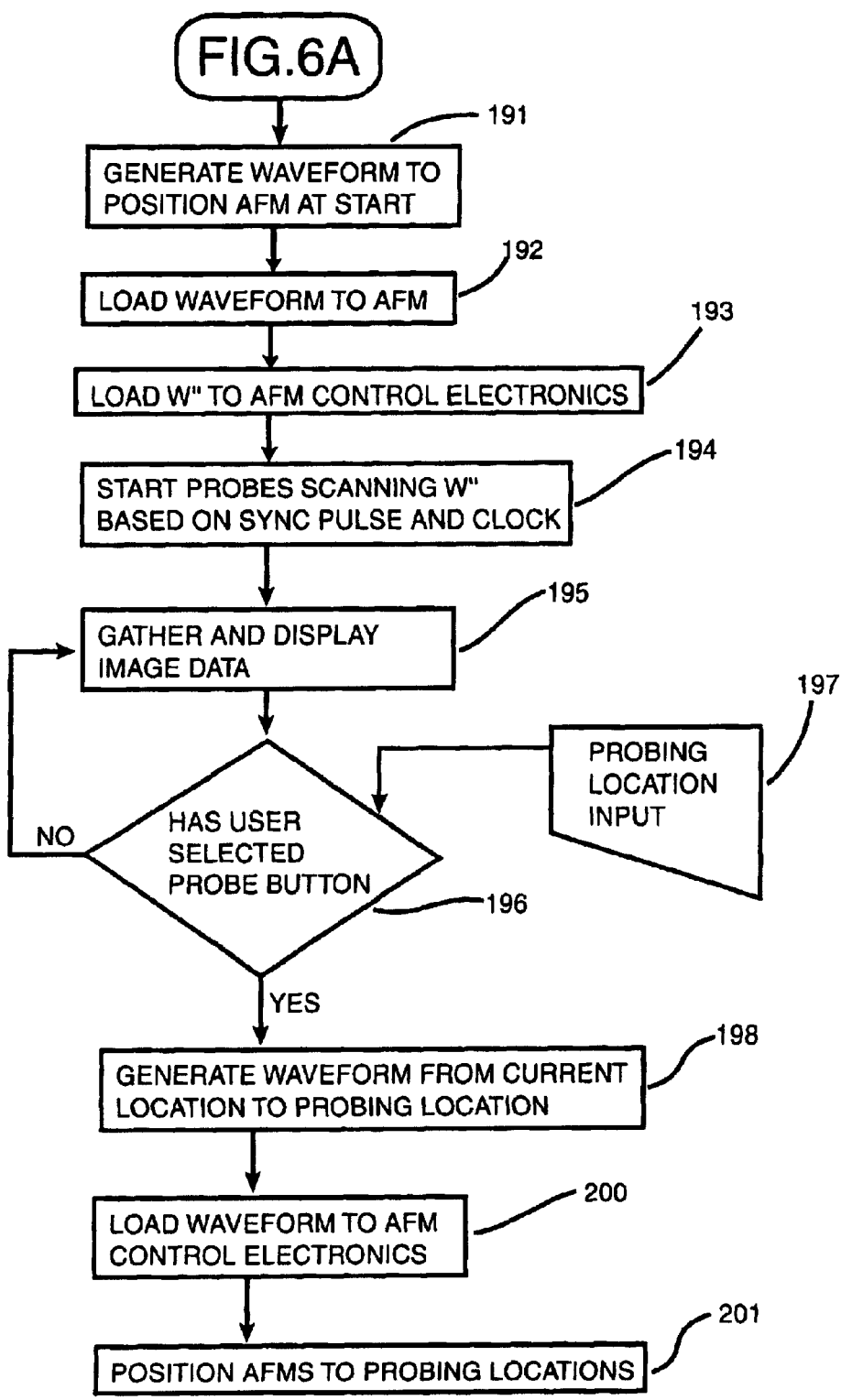

SOFTWARE SYNCHRONIZATION OF MULTIPLE SCANNING PROBES

RELATED APPLICATION

This application claims priority to U.S. provisional application Ser. No. 60/394,414, filed Jul. 8, 2002, entitled "Software Synchronization of Multiple Scanning Probes", the disclosure of which is fully incorporated herein by reference.

COPYRIGHT NOTICE

Certain software programs or routines disclosed in this application are subject to copyright protection and all rights thereto are specifically reserved. No dedication to the public of those copyrights is intended or made by such disclosure in this specification.

BACKGROUND

1. Field of the Invention

This invention generally relates to scanning probe microscopy (SPM) and failure analysis (FA), and more specifically to a system of control of multiple probe scanning when SPM is used to locate features for FA.

BACKGROUND

2. Description of the Related Art

Location of features in semiconductor microcircuits for failure analysis (FA) work has often been a difficult task. With advancing technology the size of features of interest for FA has decreased. Traditional methods of making electrical contact to features of interest in FA, also called probing, involved using mechanical positioners with fine probing needles and an optical microscope. The positioners are precision, 3-axis stages that can be manual or motorized. Attached to the positioners are sharp, probing needles. Using a traditional optical microscope and the positioner, a user would probe the FA device of interest with the needle. The small size of current semiconductor technology has made location and probing of FA features difficult or even impossible because of the limits of optical microscopy.

Scanning probe microscopy (SPM) is one technique that can be used to locate these features. SPM can be used to create and image and locate features of interest that are much smaller than features that could be located using traditional optical microscopy. Since SPM can probe only one FA feature of interest per scanning probe microscope, multiple scanning probes are needed to contact multiple features. The field of using SPM, also called Atomic Force Microscopy (AFM), for the purpose of FA probing is called Atomic Force Probing (AFP). The acronym AFP is used to describe the field as well as instruments designed for use in the field, Atomic Force Probes.

The prior art contains many examples of using SPM to locate FA features including using a single SPM to locate FA features. However, only a limited number of FA experiments can be performed with a single probe as many devices of interest for FA require 2 probes, in the case of diodes, 3 probes, in the case of transistors, or even more probes.

The limited prior art relating to multiple scanning probes for FA shows the probes scanning one at a time in order to avoid collisions. This method is effective at avoiding collisions, at least until the probes move to their respective features of interest. However, this method takes longer to perform the scanning. This allows more time for drift, such as thermal drift, to occur. Also, the simple fact of longer measurement time is a serious weakness of the prior art.

One embodiment of the prior art for 2 probes is shown pictographically in FIGS. 1a–1d. A sample 110 contains features of interest 112. These features of interest 112 may be too small to be probed easily using traditional methods. FIG. 1a shows the scanning probe tips 114 grossly positioned on the sample 110 and near the features of interest 112. Each scanning probe tip 114 will scan and image a scan area 116. FIG. 1b shows the first scanning probe tip 114 starting at a start point 118 and scanning its area of interest 116. FIG. 1c shows the same process for the second scanning probe tip 114. At any given point during scanning the scan direction 120 for the different scanning probe tips 114 may or may not be the same direction. FIG. 1b and FIG. 1c show different scanning directions, as is common in the prior art. FIG. 1d shows the scanning probe tips 114 positioned on the features of interest 112 and ready for an FA experiment. This process took twice the amount of time as was required for one scan. Similarly, if more probes are needed in the experiment the time delay scales with the number of probes used.

This process also requires a difficult initial gross positioning setup. When the scanning probes tips are initially placed, they must be sufficiently far apart so that when one scanning probe tip is scanning, it does not collide with any other scanning probe tip that is not scanning. This requires initially placing the scanning probe tips sufficiently far apart to avoid the collision, and makes placing the scanning probe tips sufficiently close together to scan and image the same area difficult.

It is, therefore, desirable to perform SPM using multiple probes and provide scanning of multiple probes in the same amount of time as would be taken to perform a scan of a single probe. This provides the advantage of less time for SPM drift effects, as well as the simple advantage of less measurement time. This also provides the advantage of a more simple and efficient initial gross positioning setup, because collision with scanning probe tips that are not scanning does not need to be avoided.

SUMMARY OF THE INVENTION

A device and method to simultaneously scan multiple scanning probes over overlapping or non-overlapping areas of interest to locate respective features of interest in a minimum amount of time employs at least two scanning probes, each probe supported by cantilever to an atomic force microscope (AFM). A controller in each AFM receives motion control signals from a master controller generating a first motion control signal for a first one of the AFMs for motion in a first axis and a second motion control signal for the first AFMs for motion in a second axis. The second axis is substantially perpendicular to the first axis. The master controller then calculates a first offset motion control signal responsive to the first motion control signal for a second one of the AFMs for motion in spaced relation to the first one of the AFMs in the first axis and a second offset motion control signal responsive to the second motion control signal for a second one of the AFMs for motion in spaced relation to the first one of the AFMs in the second axis.

BRIEF DESCRIPTION OF THE DRAWINGS

These and other features and advantages of the present invention will be better understood by reference to the following detailed description when considered in connection with the accompanying drawings wherein:

FIG. 6b is a continuation of the flow chart of FIG. 6a;

DETAILED DESCRIPTION OF THE INVENTION

Figure 1A:
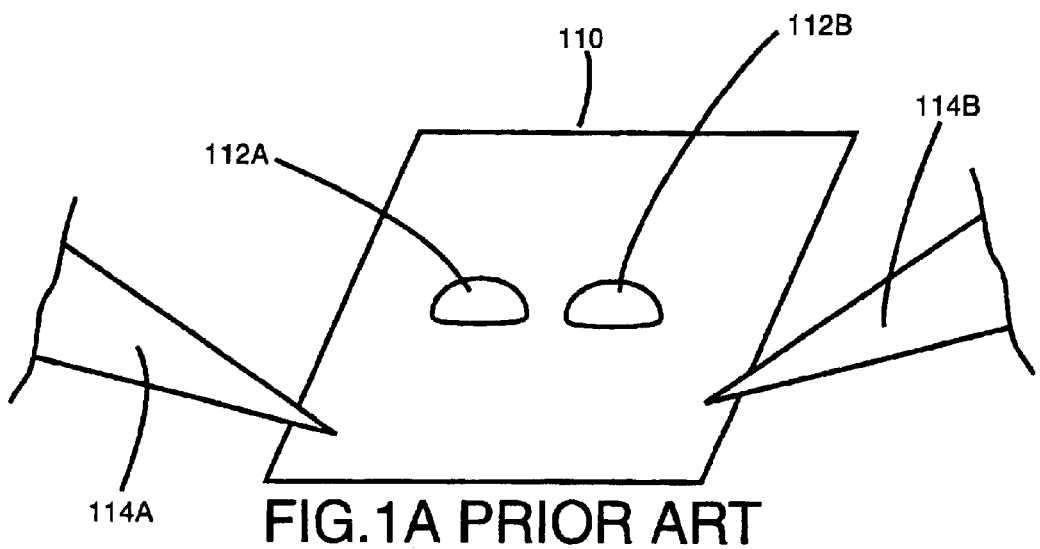
FIGS. 1a to 1d depict prior art technique of scanning multiple scanning probes one after another to scan and probe features of interest.
Figure 1B:
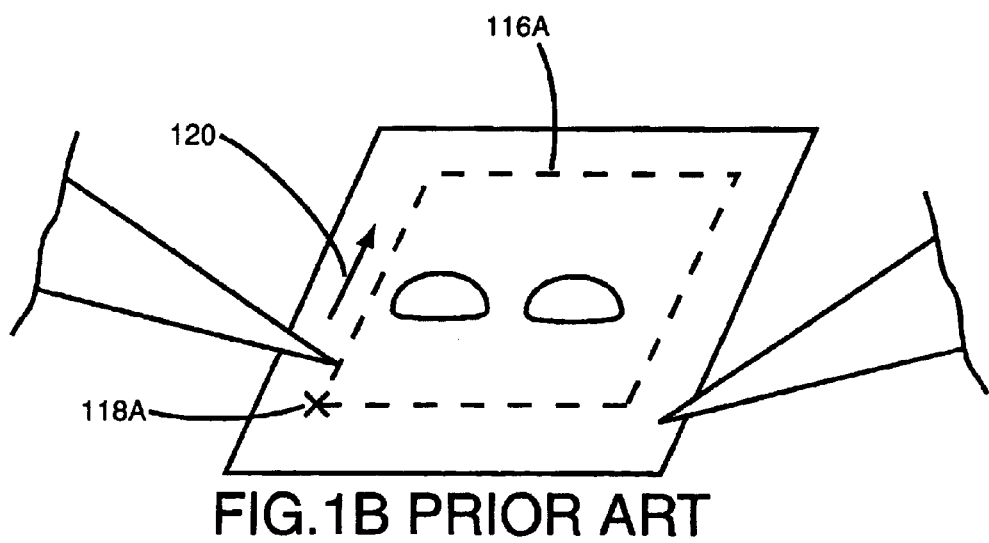
Figure 1C:
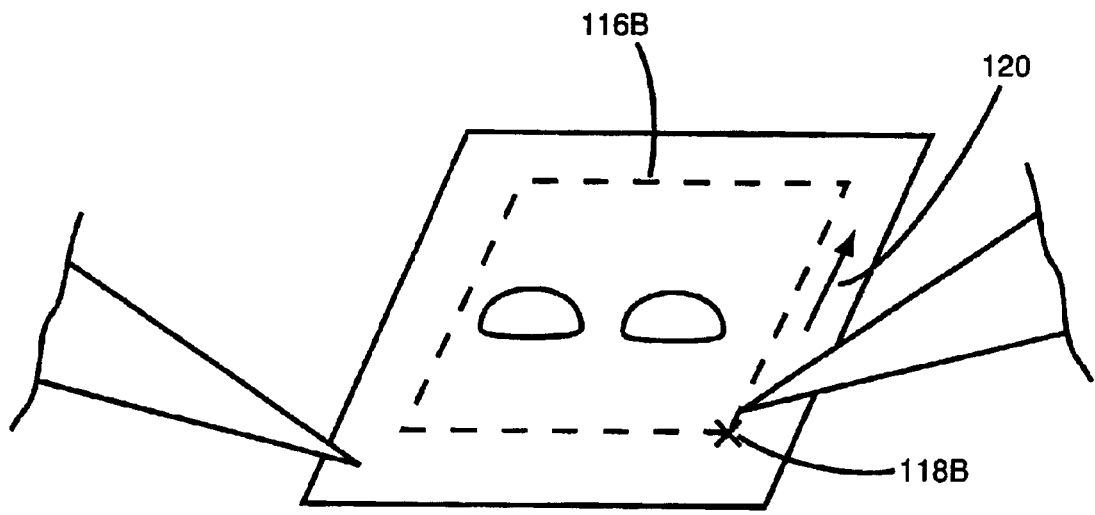
Figure 1D:
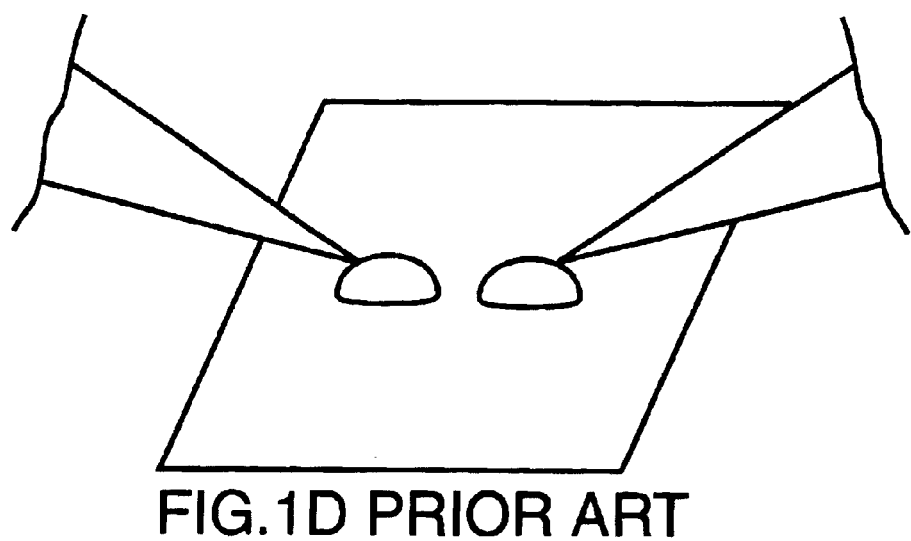
Figure 2A:
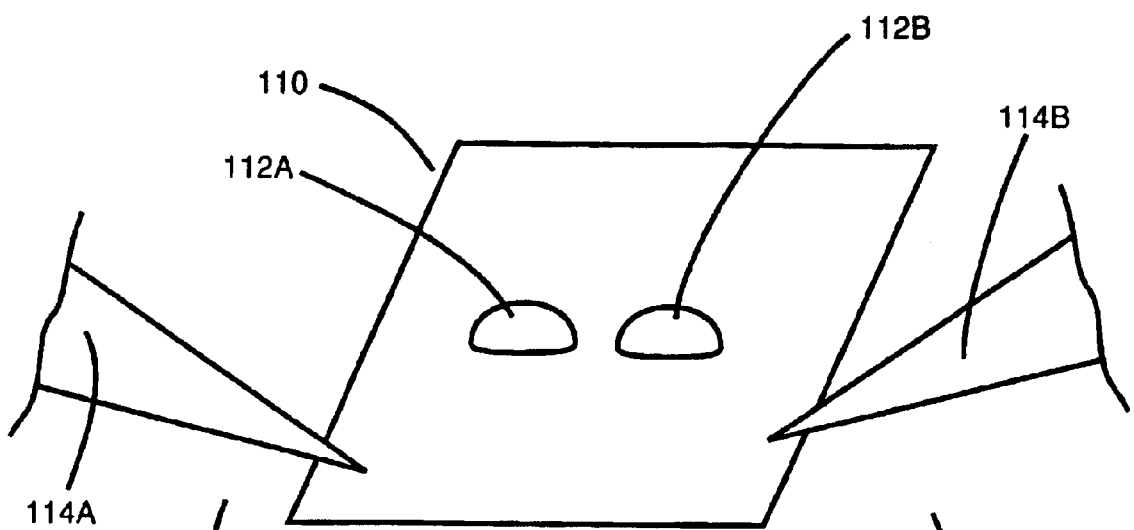
FIGS. 2a to 2c depict employment of an embodiment of the present invention for scanning multiple scanning probes simultaneously to scan and probe features of interest.
Figure 2B:
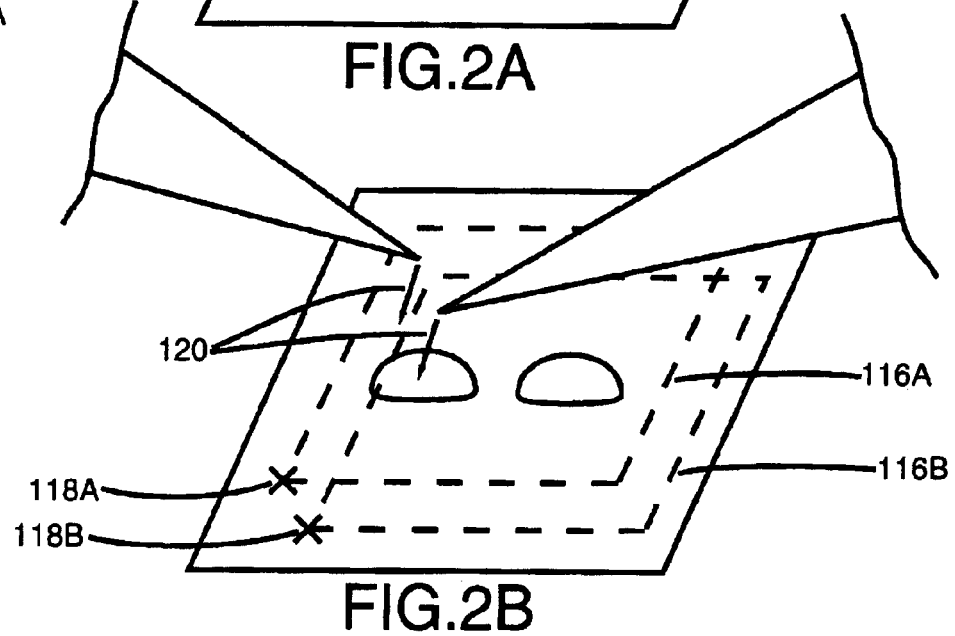
Figure 2C:
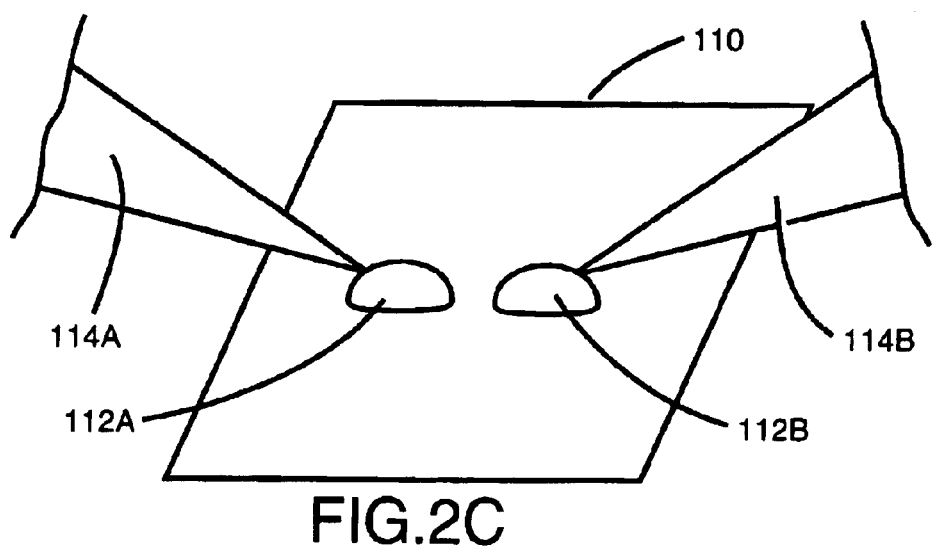

As shown in FIG. 2a, an embodiment of the present invention employs two or more scanning probe tips 114a and 114b that are located near a sample 110. The sample 110 contains the features of interest 112a and 112b. FIG. 2b shows the scanning probe tips in relation to desired scan areas 116a and 116b respectively. Note that in the embodiment shown, the scan areas 116a and 116b are overlapping. Each scan area has a start point 118a and 118b where the respective scanning probe tip will begin its scan. Each scanning probe tip also has a scan direction 120a and 120b respectively. In the embodiment shown the scan directions 120a and 120b are always parallel and offset for all scanning probe tips. This provides for simultaneous motion of the probe tips in spaced relation thereby avoiding collision. FIG. 2c shows the scanning probe tips positioned on the features of interest and ready for an electrical measurement or force measurement.

Figure 3A:
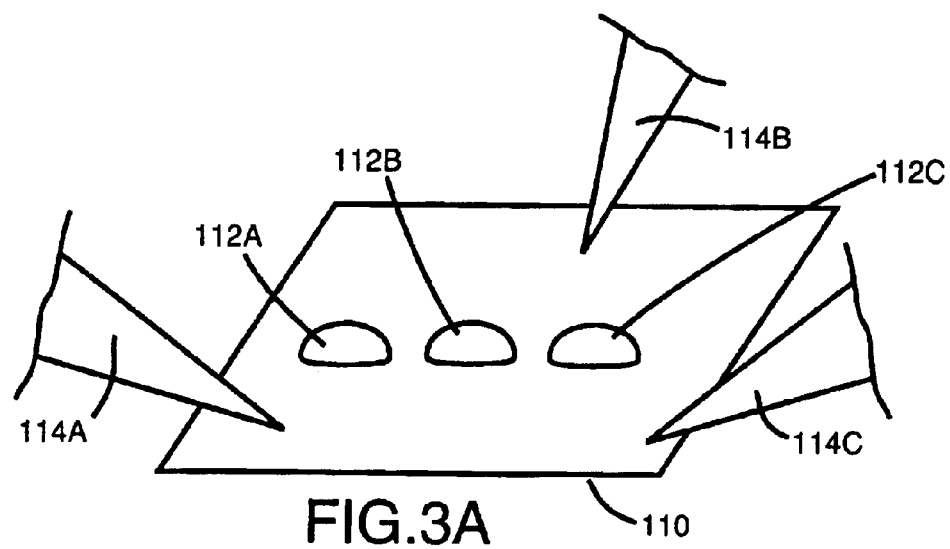
FIGS. 3a to 3c depict an embodiment of the present invention for 3 probes.
Figure 3B:
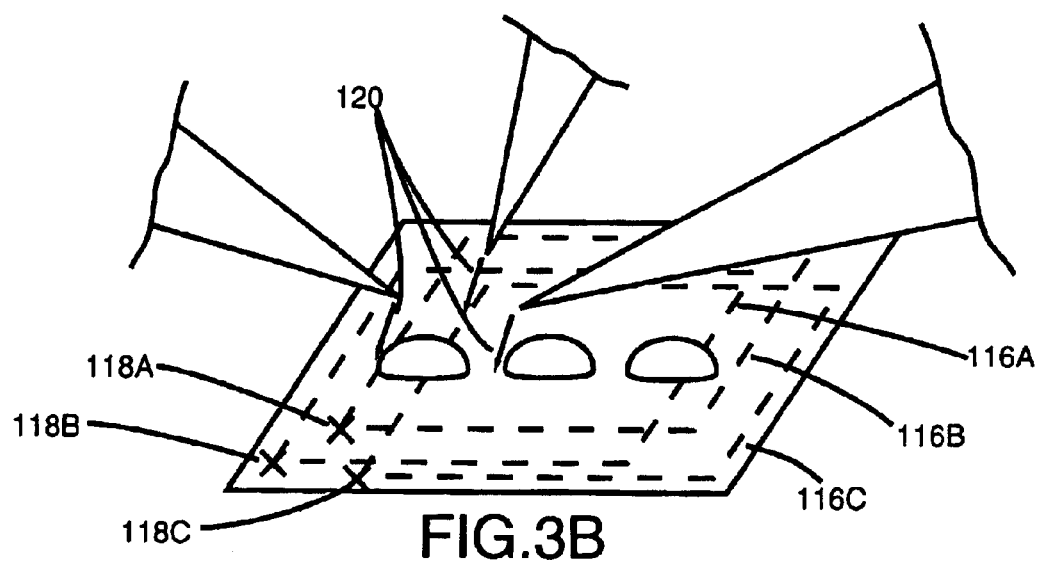
Figure 3C:
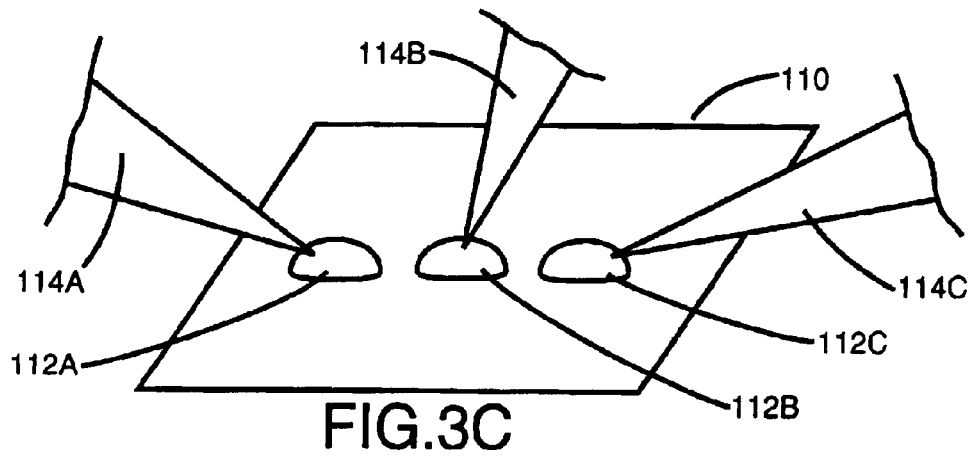

FIGS. 3a, 3b and 3c show an embodiment of the invention adding a third probe 114c for simultaneously scanning a third desired scan area 116c. A third feature of interest 112c is also depicted.

Figure 4:
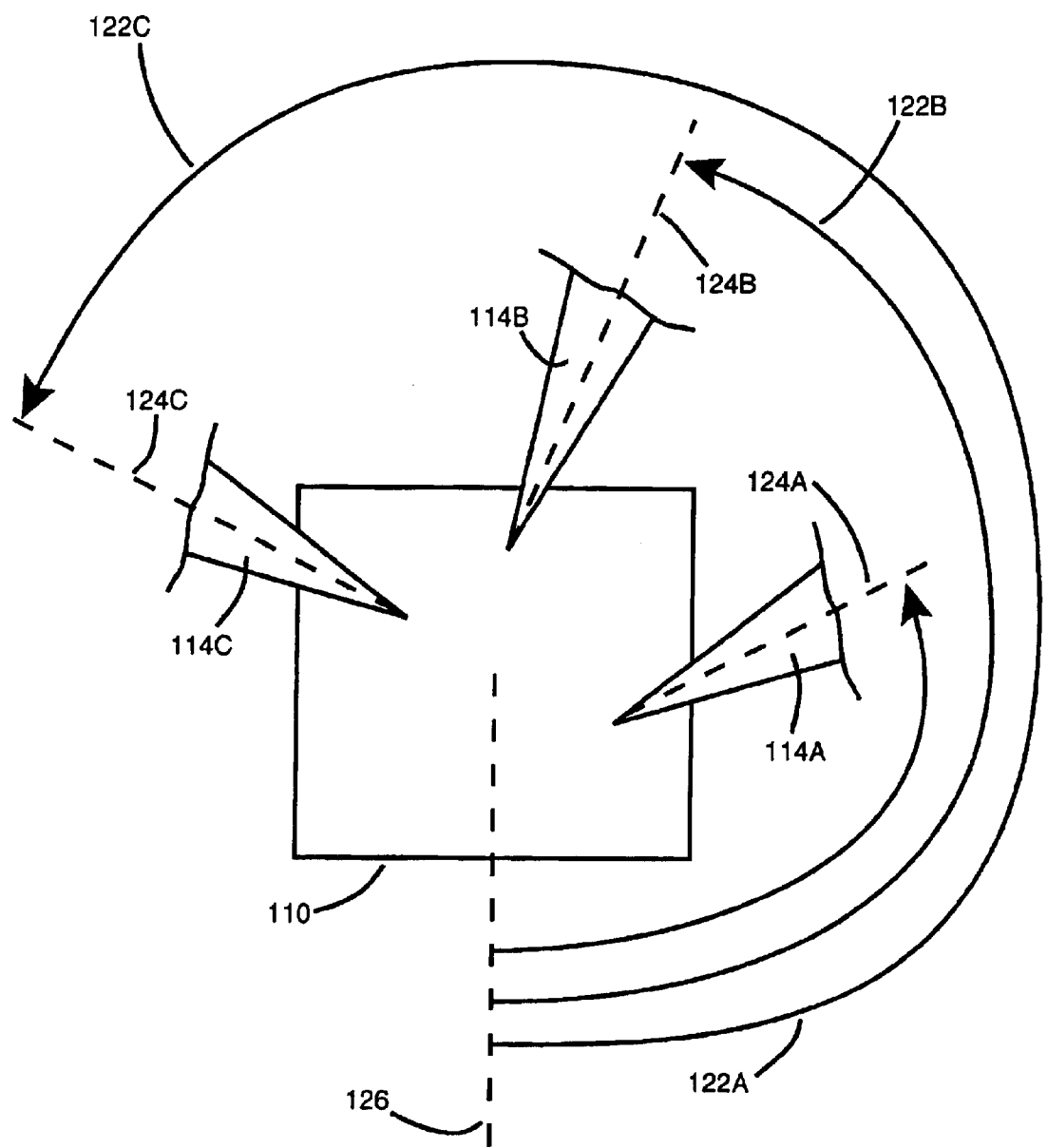
FIG. 4 shows three scanning probe tips and the sample, as viewed from the top.

FIG. 4 shows the geometrical relationship of three scanning probe tips 114a, 114b and 114c positioned over the sample 110. The scanning probe tips are at different angles from one another. The platen angle 122a, 122b and 122c of scanning probe tips 114a, 114b and 114c, respectively, is the angle of the probe centerline 124a, 124b and 124c, respectively, as measured from a reference axis 126. Each scanning probe tip has a unique platen angle. The present invention employs the platen angle for the probe tips for generation of control signals as will be described in greater detail subsequently.

Figure 5A:
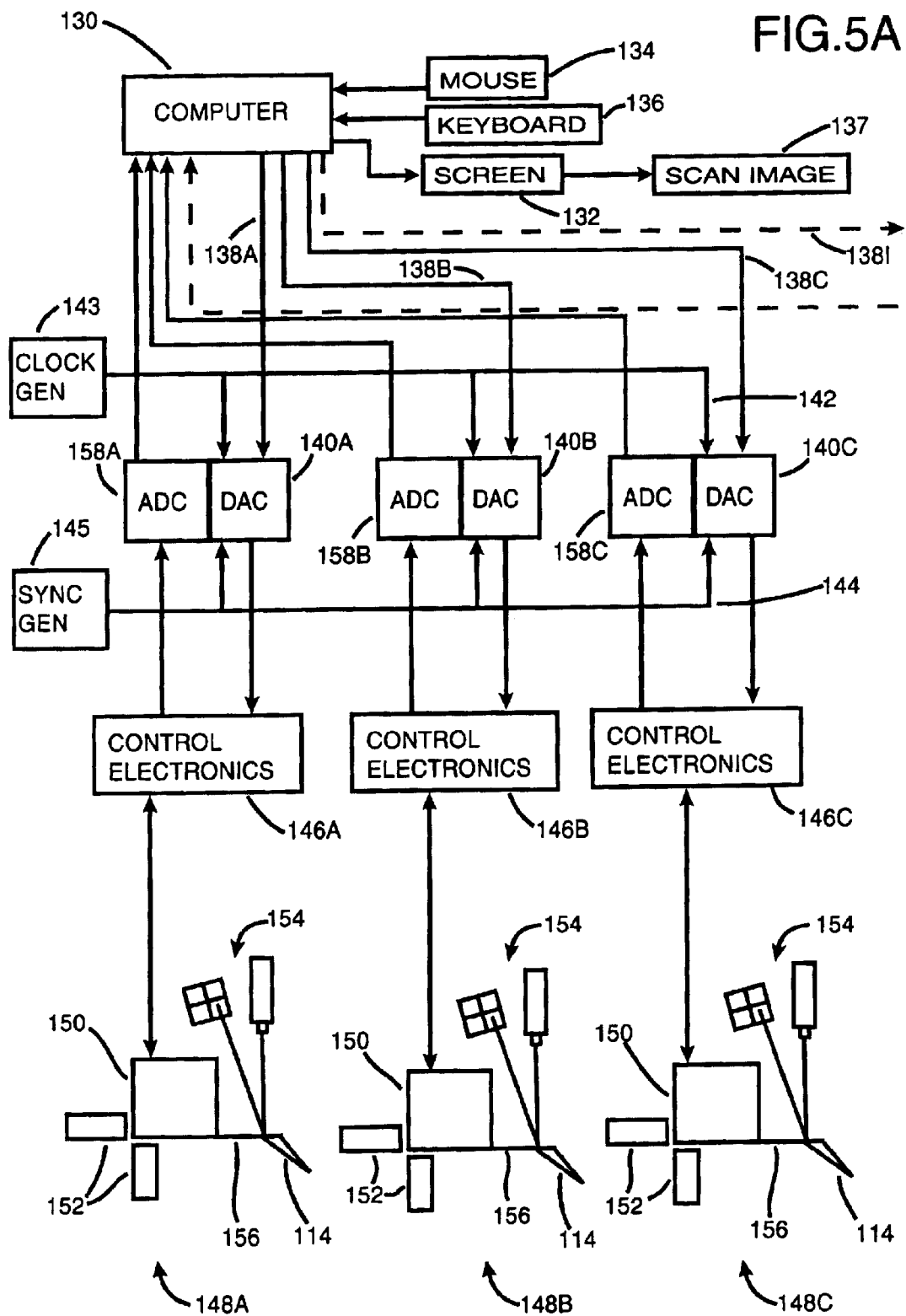
FIG. 5a is a block diagram of the hardware configuration of an embodiment of the invention.

FIG. 5a shows a schematic diagram of the elements of an AFP system embodying the present invention. The user accesses the software via a computer 130. The computer is of a standard configuration, such that it is connected to a screen 132, a mouse 134, and a keyboard 136. The scan image 137 is displayed on the computer screen. The computer 130 generates scan waveforms 138a, 138b and 138c. A generalized case for more than three probes is represented by waveform 138i. The generation of the scan waveforms is described subsequently with respect to FIG. 6. There is one complete, independent set of scan waveforms to control motion of a probe tip for each feature of interest 112. The scan waveforms are output to digital to analog converters (DACs) 140a, 140b and 140c respectively. There is one DAC 140 for each probe tip control. The DACs share a clock signal 142 provided by clock generator 143 that ensures the scan waveforms remain synchronized. The DACs also share a synchronization pulse 144 provided by sync generator 145 that ensures that the scanning starts at the same time. The DACs drive control electronics 146a, 146b and 146c. Control electronics for SPM operation are well known to one skilled in the art. There is one complete, independent set of control electronics for each probe. The control electronics are each connected to an AFM head 148a, 148b and 148c respectively. Each AFM head contains a 3-axis actuator 150, a feedback position sensor 152 and a deflection sensor 154. The 3-axis actuator provides for scanning along the sample 110. The feedback position sensor 152 in conjunction with the control electronics provide calibrated scanning. The deflection sensor 154 in conjunction with 1-axis of the 3-axis actuator provides for constant force AFM scanning. This system may also be operated without force feedback, where the deflection sensor is used to generate the scan image. There is one complete, independent AFM head for each feature of interest for which simultaneous probing is desired. Attached to the AFM heads are the cantilever 156 and scanning probe tips 114. In the embodiment shown, the AFM heads are able to position multiple scanning probe tips in close proximity to one another. The control electronics generate the image data 157. The image data is passed to the analog to digital converters (ADCs) 158. The ADCs convert the image data to digital format pass the image to the computer. The computer can then display the image data to the user on the computer screen.

Figure 5B:
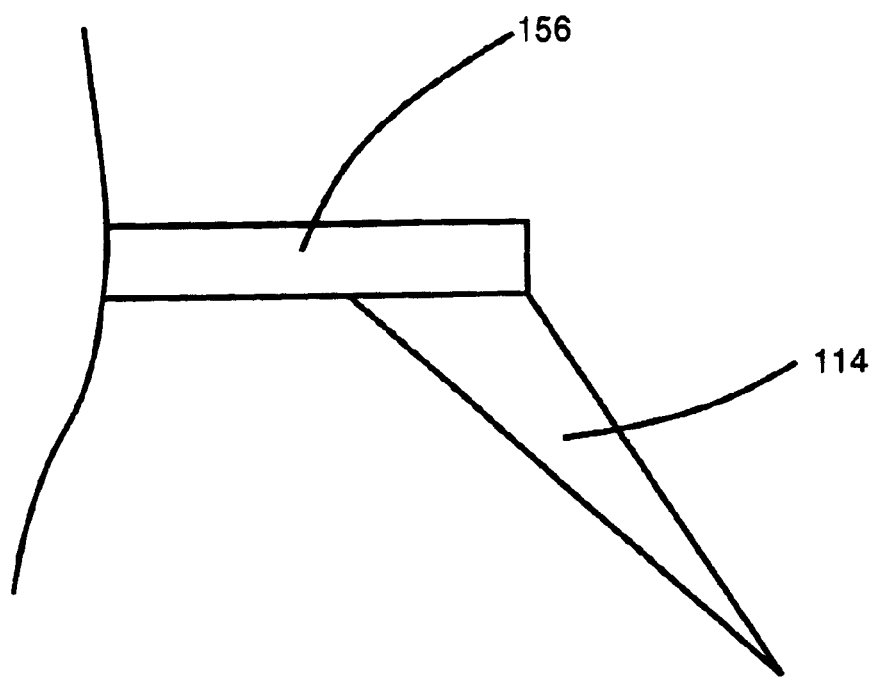
FIG. 5b is a detailed side view of an embodiment of the probe tip and cantilever

FIG. 5b shows a detailed side view of an embodiment of the probe tip employed with the present invention attached to a cantilever. In this embodiment the deflection sensor uses the reflective back of the cantilever to determine the deflection of the cantilever. The arrangement of the probe tip and cantilever shown allows the greatest clearance between multiple probes operating in close proximity. The angled attachment of the probe tip to the cantilever, or in alternative embodiments, the angling of the cantilever attachment to the AFM, to position the extreme end of the probe tip as far as possible from the AFM is employed to achieve this feature.

Figure 6A:
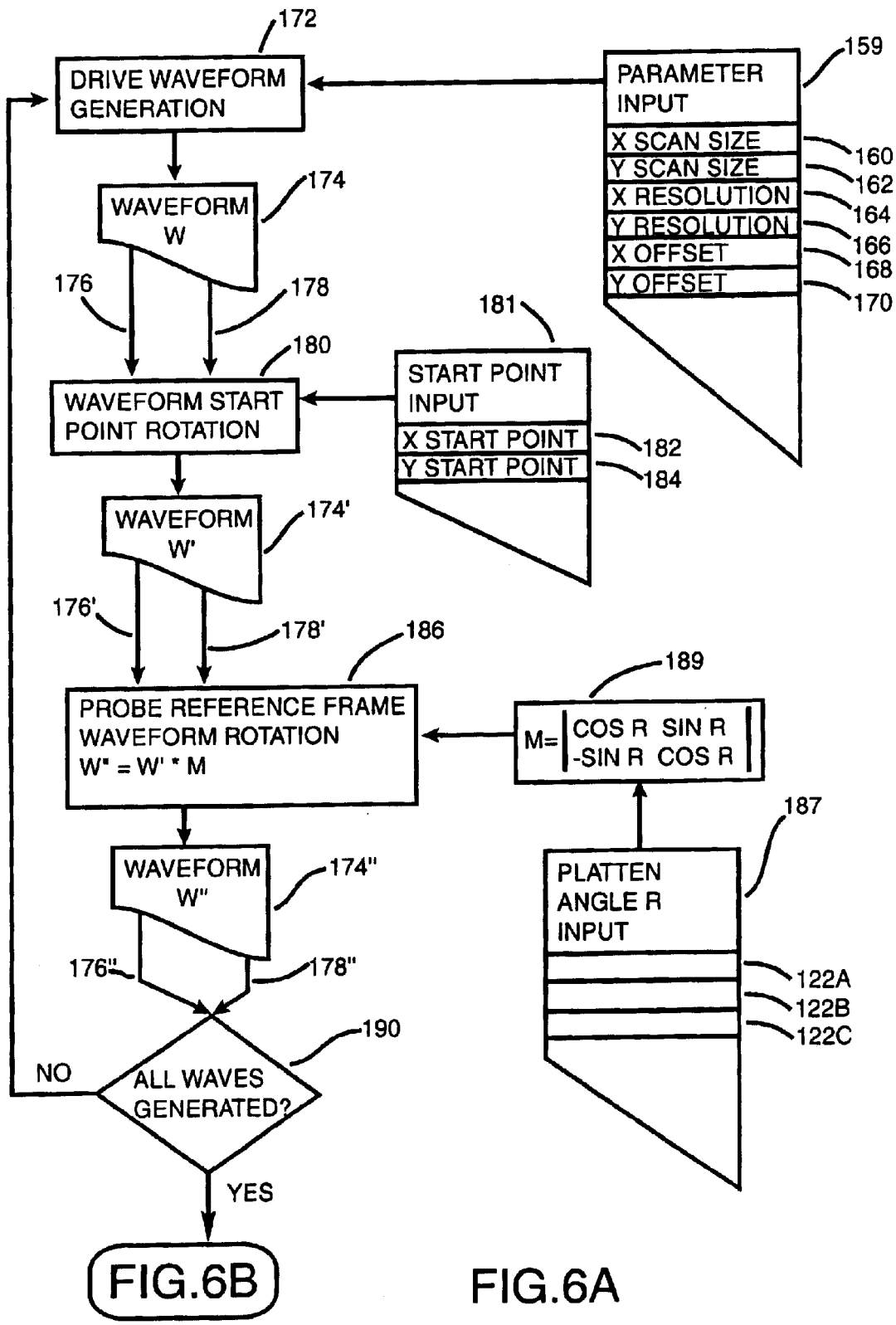
FIG. 6a is a flow chart for software implementation of certain control aspects for an embodiment of the invention.

FIG. 6 is a flow chart of the mathematical operations of the software. The standard SPM scan parameters input 159 consists of X scan size 160, Y scan size 162, X resolution 164, Y resolution 166, X offset 168 and Y offset 170 which are used by subsequent routines to create a scan waveform for the AFM manipulating each probe tip.

The drive waveform generation routine 172 takes the SPM scan parameters input and outputs a drive waveform 174, identified as W, that contains both an X value output 176 and Y value output 178. In one embodiment, shown in FIG. 7c and FIG. 7d and described subsequently, the drive waveform is a triangle wave with the peaks and valleys rounded off, at the last 5 points. For this embodiment, the waveform generation is accomplished in the following sequence. The X values of the drive waveform are centered about the value 'X offset'. The X values of the drive waveform have amplitude of 'X scan size' divided by 2. The X values of the drive waveform have the number of points per cycle equal to 2 multiplied by the value 'X resolution'. The X values of the drive waveform have a number of cycles equal to 2 times the value 'Y resolution'. The Y values of the drive waveform are centered about the value 'Y offset'. The Y values of the drive waveform have amplitude of 'Y scan size' divided by 2. The Y values of the drive waveform have the number of points per cycle equal to 2 multiplied by the value 'X resolution' multiplied by the value 'Y resolution'. The Y values of the drive waveform have 1 cycle. The X offset and Y offset values define the location of the scan area.

The code described herein to achieve the desired AFM control has been programmed in existing embodiments using a LabVIEW compiler available from National Instruments Corporation, 11500 N Mopac Expwy, Austin, Tex. 78759-3504, as shown in Appendix A hereto which is incorporated herein by reference.

The start point rotation routine 180 takes the drive waveform, W, and based on desired start point input 181 rotates the X values of the drive waveform and the Y values of the drive waveform so the X start point 182 and Y start point 184 are the first points in the waveforms. This calculation places the probe tips at start points 118a, 118b or 188c, as described previously with respect to FIGS. 2b and 3b, are the locations where the probes will begin scanning. In the start point routine, rotation is defined in the software-programming context; taking a 1 dimensional array of numbers, moving a section of the numbers from the rear to the front, and placing the numbers that use to be at the front, at the rear. The start point rotated X value output 176' and the Y value output 178' of the new waveform W' 174' are the resulting output of the start point rotation routine.

The scan rotation routine 186 transforms the drive waveform W' to the spatial reference frame of the individual AFM heads 148. The input parameter platen angle R 187 for each AFM head and associated probe tip, is the angle 122a, 122b or 122c of the probe tip centerline 124a, 12b or 124c, respectively, measured relative to the arbitrary reference axis 126 on the sample as described previously with respect to FIG. 4. The output result of this routine is a rotated drive waveform W" 174" having an X value output 176" and a Y value output 178". For the embodiment described herein, a multiplication by a rotation transformation matrix M 189, formed based on an angle value equal to the platen angle R for each AFM probe tip, is performed. In scan rotation routine, rotation is defined in the linear algebra context; to multiply by a matrix of the form given in the scan rotation routine to rotate the input array about the origin by the given angle.

If all rotated drive waveforms W'" as determined by interrogatory 190, have been generated. If some AFM control electronics have not been generated, then the process repeats itself for the next SPM starting with the waveform generation routine 172. Because the invention assumes more than one AFM, the above routines will execute at least twice, corresponding to two or more AFMs. If all AFMs have generated their respective rotated drive waveform, W", then waveforms aregenerated in routine 191 to position the probe tip of each AFM at its respective start point. The positioning waveform is then loaded into the AFM control electronics in routine 192 and each AFM movesits respective probe tip toits start point. All AFM control electronics start with a common synchronization pulse 144, so all begin at the same time. All AFM control electronics also share a common clock signal 142, so they all proceed at the same rate.

Upon reaching the start points, the rotated drive waveform W" is loaded in routine 193 to the AFM control electronics 146a, 146b or 146c respectively. Then scanning routine 194 begins. All AFM control electronics 146 start with a common synchronization pulse 144, so all begin at the same time. All AFM control electronics also share a common clock signal 142, so they all proceed at the same rate.

The data from the AFM control electronics 146 is gathered in step 195 and displayed as an image on the computer screen 132 to the user. During operation of the scanning routine, a monitoring function 196 is concurrently checking if the user has selected the probe button on the computer screen 132. If the probe button has not been selected the scanning routine continues to gather data and update the display image. Note that in the embodiment shown the probe button is a software button and does not have a physical location. If the user has selected the probe button, reflected by operation 197, then the probe point routine takes the user's probing locations input, calculates a waveform 198 to move from the current location of the scanning probe tips to the user's probing locations and outputs the waveform, as reflected in routine 200, to the AFM control electronics. The scanning probe tips are moved by the AFM control electronics to the location specified by the user's probing location as shown in block 201. This routine is identical in function, but different in input to the start point positioning generation routine. The input to this function is the probing point, rather than the start point.

Figure 7A:
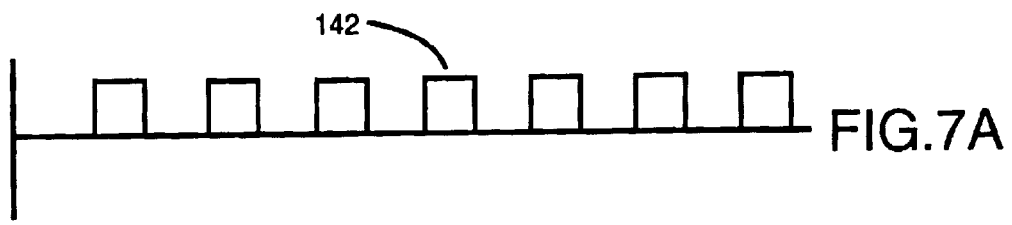
FIGS. 7a to 7f are schematic representations of some of the electrical waveforms in the embodiment described.
Figure 7B:
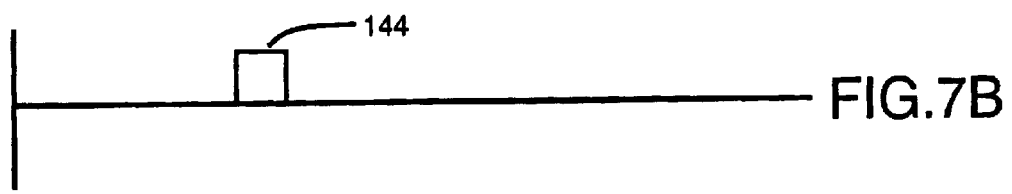
Figure 7C:
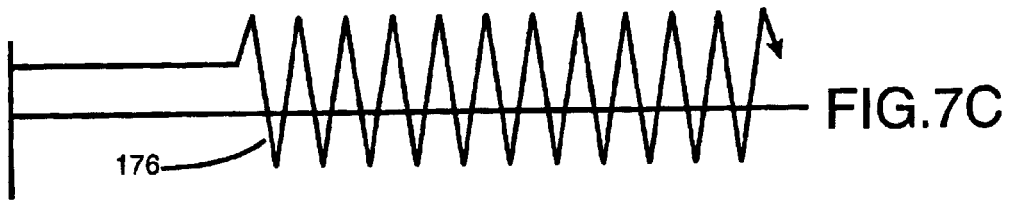
Figure 7D:
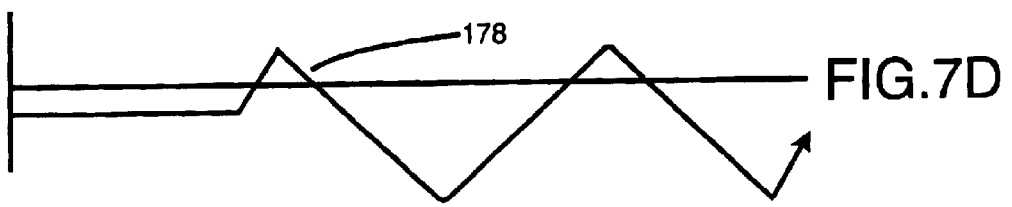
Figure 7E:
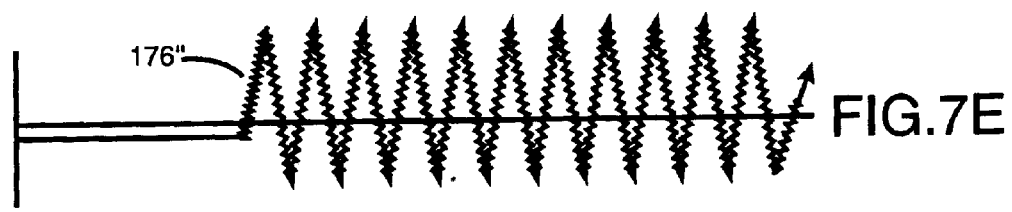
Figure 7F:
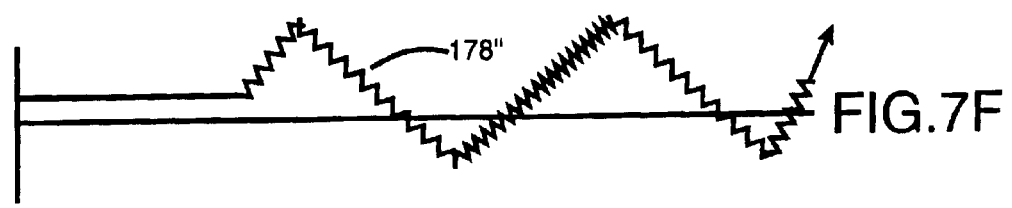

FIGS. 7a through 7f show examples of some of the electrical signals during the execution of the scanning operation. FIG. 7a is the shared clock 142 that is used to make sure all AFMs remain synchronized. FIG. 7b shows the synchronization pulse 144 that signals for all AFMs to begin at the same time. FIG. 7c shows the X values of the drive waveform 176 generated by the waveform generation routine 172. FIG. 7d shows the Y values of the drive waveform 178 also generated by the waveform generation routine 172. FIG. 7e shows an example of the X values of the rotated drive waveform W'" 188, for an AFM head that is rotated to an exemplary arbitrary platen angle relative to the sample 110. FIG. 7f shows an example of the Y values of the rotated drive waveform W'" for the AFM head. These waveforms are generated by the scan rotation routine 186. Note that after the scan rotation routine 186 the rotated drive waveform 188, W', depend greatly on the platen angle 122.

Operation of the embodiment of the invention disclosed herein is accomplished as follows. The system employs multiple scanning probe microscopes. The scanning probe tips may be in close proximity to one another, such as a few microns to under 1 micron. Additionally, the scanning probe tips are centered in their travel, engaged on a sample and may be able to scan an overlapping scan area. As previously described with respect to FIGS. 2a, 2b, 2c, 3a, 3b, and 3c, the scan area 116 contains multiple features of interest 112.

Using the computer 130 the user enters various scanning parameters such as X scan size 160, Y scan size 162, X offset 168, Y offset 170, X resolution 164, Y resolution 166, X start point 182, Y start point 184 and platen angles for the AFM probe tips (122a, 122b and 122c for the three probe example disclosed herein).

The user tells the computer to begin scanning and the software routine running on the computer 130 starts the procedure illustrated in FIG. 6. The waveform generation routine 172 generates a drive waveform W, so that each scanning probe tip will raster an area described by the scanning parameters.

The drive waveforms W are rotated by the start point rotation routine 180 so that all scanning probe tips will start at the same point in their respective drive waveforms. This will ensure that the spacing between the AFM probe tips 114 will be constant for the start of scanning.

Next, the drive waveforms are rotated by the scan rotation routine 186 to result in the rotated drive waveforms W". This rotation ensures that even though all AFM heads and their associated scanning probe tips have a different platen angle they will all scan at the same direction at the same time and further ensures that the spacing between scanning probe tips will remain substantially constant for the duration of scanning.

Next, the rotated drive waveforms W" are loaded to the DACs 140a, 140b and 140c respectively. The AFMs are positioned placing the probe tips at the start points. Once the rotated drive waveforms have been loaded, all AFM control electronics share a common clock 142. This ensures that the scanning probe tips will stay synchronized. Then the synchronization circuit issues a synchronization pulse 144, which signals all AFM control electronics 146 to begin scanning. This ensures that all of the AFMs start scanning at the same time. The DACs then output their respective rotated drive waveform to their AFM control electronics. During scanning the scanning probe tips move in spaced relation to maintain constant spacing to when they first started scanning. Each set of AFM control electronics controls the feedback position sensors 152 and the 3-axis actuator 150 in the associated AFM head 148 to scan in a calibrated manner. Each deflection sensor 154 monitors the deflection of the cantilever 156 to which the scanning probe tip 114 is attached. This deflection signal is returned to the SPM control electronics 146 and displayed to the user on the computer screen 132.

During scanning the AFM probe tips move in an identical scanning direction 120 at all times, as shown in FIGS. 2a–c and 3a–c. Similarly, the starting points 118a, 118b and 118c are in the same relative location for the scan areas 116a, 116b and 116c for all scanning probe tips. Additionally, the spacing between the scanning probe tips is constant at all times.

During scanning the computer 130 gathers data from the AFM control electronics 146 and displays it on the computer screen 132. When the user locates the features of interest 112 on the computer screen, he or she can choose to probe those features. The user then selects the location of the features of interest to be probed as the probing location 196 and selects the probe button 194. Then the computer 130 will calculate and output a waveform to the DACs 140 which will drive the AFM control electronics 146, which will drive the scanning probe tips to a respective point on the sample 110 corresponding to the probing location 196. The DACs 140 will share their common clocks 142 and synchronization pulse 144 as before. The DACs 140 will then drive the AFM control electronics 146. This will cause the scanning probe tips to move to the probing locations 196. Note that, for the first time since scanning began, the spacing between scanning probe tips 114 is no longer constant once the scanning probe tips 114 begin to move toward the probing locations 196.

Figure 8A:
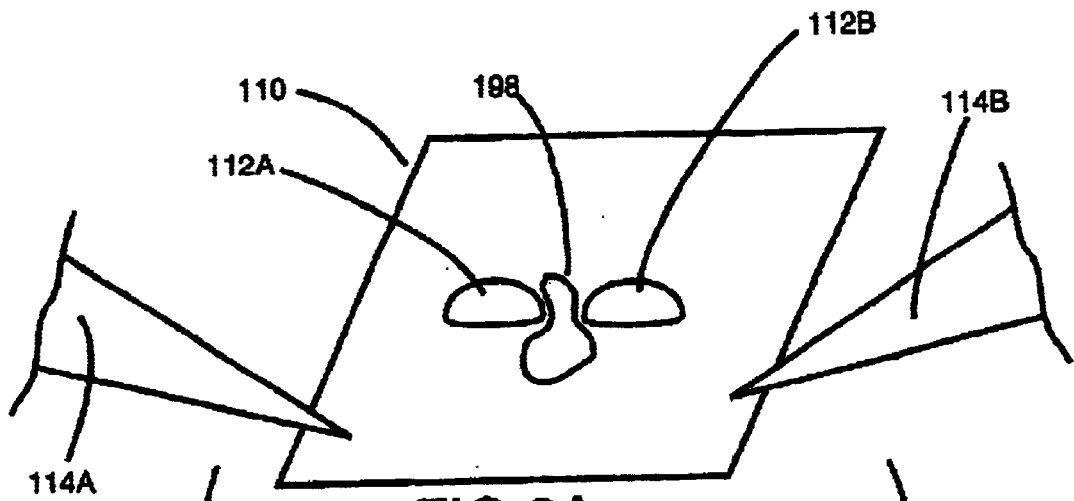
FIGS. 8a to 8c show employment of an embodiment of the present invention scanning multiple scanning probes simultaneously to scan and probe features of interest while avoiding a certain area.
Figure 8B:
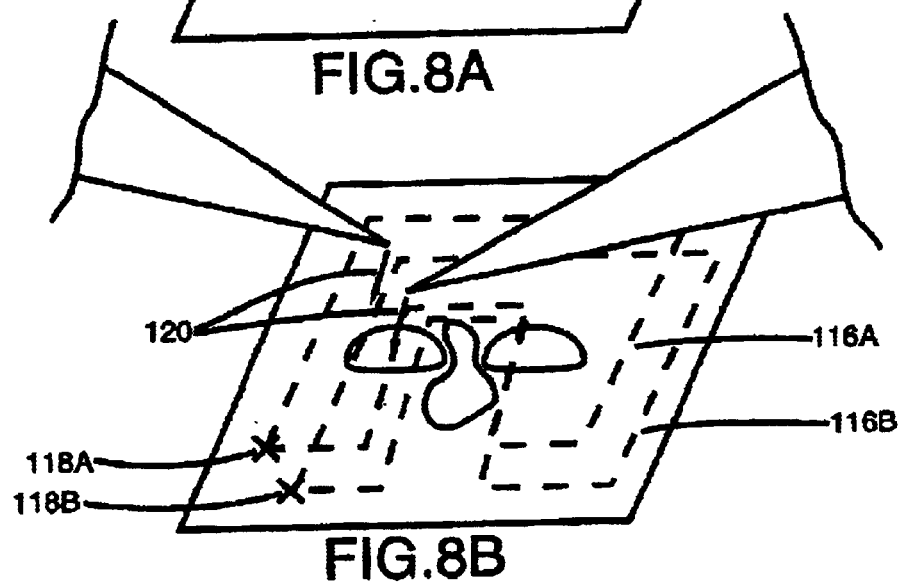

For an alternative embodiment of the invention with enhance functionality, FIG. 8a shows the sample 110, features of interest 112a and 112b and an area to be avoided 198. In FIG. 8a the scanning probe tips 114a and 114b are positioned on the sample 110. FIG. 8b shows each of the scanning probe tips has its own scan area 116a and 116b, respectively, that excludes the area to be avoided 198. In the embodiment shown, the spacing between scanning probe tips 114a and 114b may not always be constant. In this embodiment the probes retract in Z, the out of the plane of the sample direction, to avoid the area to be avoided. Each scan area 116 has a start point 118 that is where the scanning probe tip 114 will begin. Each scanning probe tip 114 also has a scanning direction 120. In the embodiment shown the scanning directions 120 are substantially the same for all probe tips 114.

Figure 9:
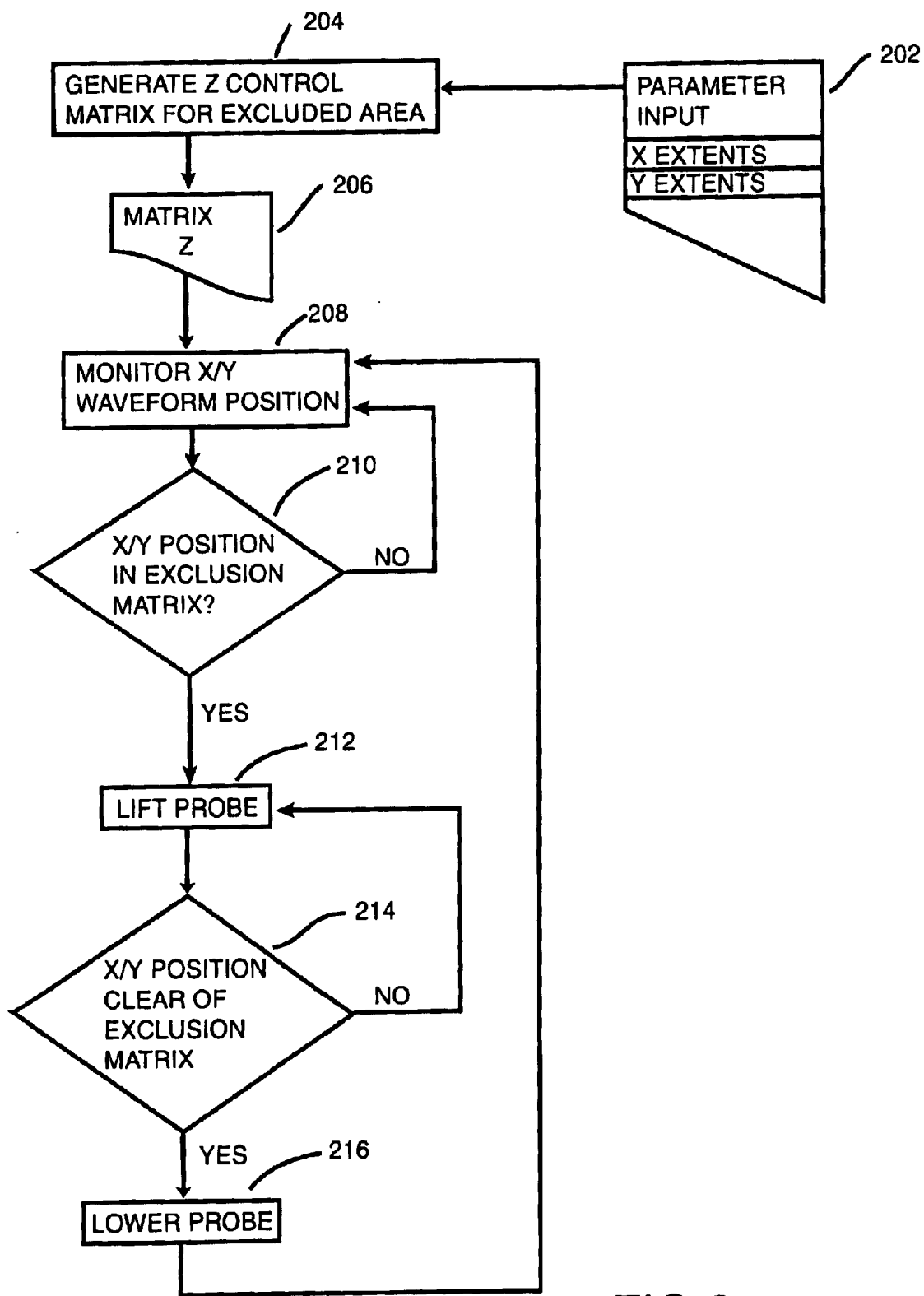
FIG. 9 is a flow chart for the software implementation of the Z axis control for area avoidance; and, FIGS. 10a to 10c show waveforms representative of the control signals for the control routine defined in FIG. 9
Figure 10A:
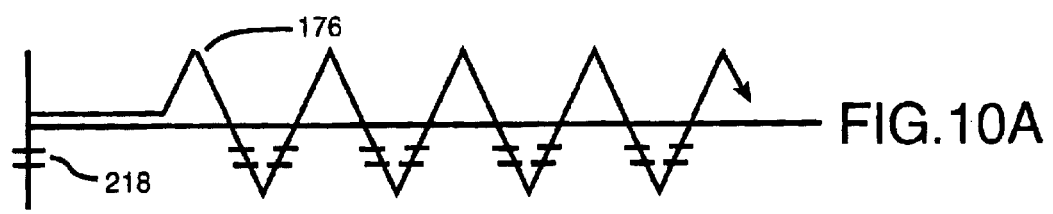
Figure 10B:
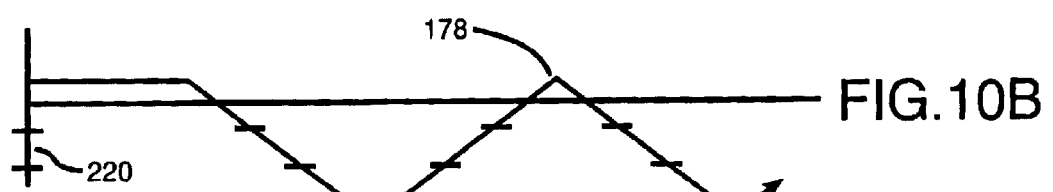

FIG. 9 shows in flow chart form the generation of the Z axis probe retraction waveform consistent with the area to be avoided which is overlaid on the waveform generation for the X and Y components of the AFM motion. FIGS. 10a, 10b, show the waveforms of FIGS. 7c and 7d expanded and truncated for clarity. FIG. 110c show the corresponding Z axis actuation for the avoided area associated with the X and Y motion. Referring to FIG. 9, the X and Y extents of the area to be avoided are provided as parameter input 202 to generation routine 204 for a control matrix 206 for the excluded area. A simple rectangular area is shown for the embodiment in the drawings, but is not a limitation on the invention. For purposes of explanation the operation of only one probe tip and AFM is described herein. The control electronics monitor the X/Y position 208 of the probe tip as driven by the appropriate waveform 178 for X position and 176 for Y position shown in expanded form in FIGS. 10b and 10a respectively. If the probe tip position has entered the exclusion matrix values 210, the probe is lifted 212 by the Z axis control in the AFM. The X/Y position is then monitored to determine when the probe tip is clear of the exclusion matrix values 214 at which time the probe is lowered 216 to resume generation of image data.

Figure 8C:
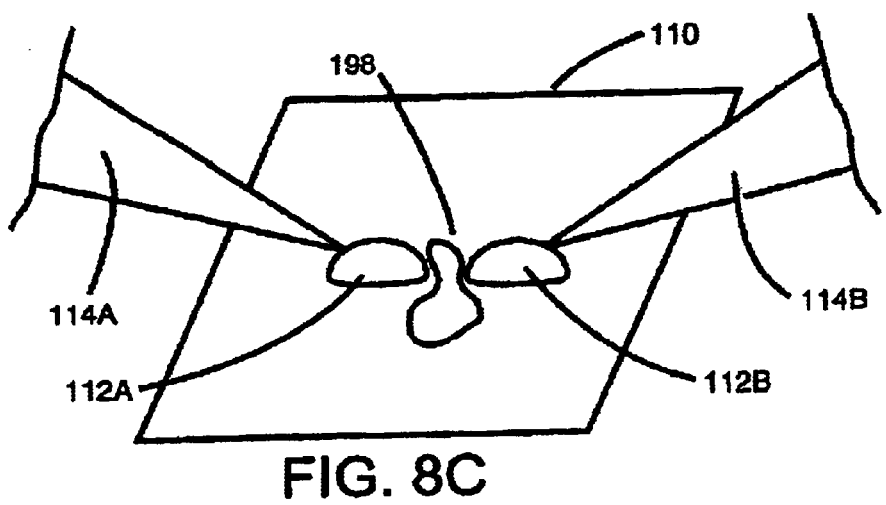
Figure 10C:
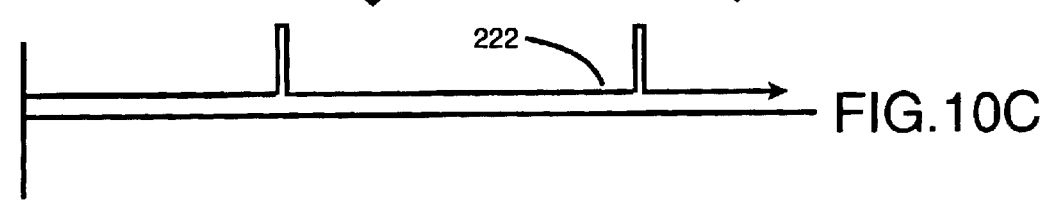

The exclusion area is graphically demonstrated in FIG. 10a as Y exclusion zone 218 and FIG. 10b as X exclusion zone 220. The resulting Z axis waveform 222 shown in FIG. 10c demonstrates the lifting of the probe tip when in the exclusion area. FIG. 8c shows the scanning probe tips 114 positioned on the features of interest 112 and ready for an FA experiment.

A commercially available version of an embodiment of the invention is the Atomic Force Probe (AFP) system available from MultiProbe, Inc, 10 E. Islay Street, Santa Barbara, Calif. 93101, the assignee of the present application. This system is capable of placing the scanning probe tips in close proximity, being less than a few microns, as shown in FIG. 2c or 3c. This system has feedback position sensors 152 for the 3-axis actuator 150 and supporting SPM control electronics 146 as shown in FIG. 5. This system also executes the software routine shown in block diagram form in FIG. 6. For 3 scanning probe tips 114 this microscope performs the operation shown pictographically in FIG. 3.

An additional commercially available atomic force microscope (AFM) is the Veeco Metrology AFM head with supporting control electronics available from Veeco Metrology Group, 112 Robin Hill Road, Santa Barbara, Calif. 93117. This commercially available system does not presently support the invention, however, this system contains the elements shown in FIG. 5. The most noteworthy of these elements are the feedback position sensors 152 for the 3-axis actuator 150 and the supporting AFM control electronics 146 as shown in FIG. 5. This system also does not have the ability to place multiple scanning probe tips in close proximity.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A scanning probe microscopy system comprising:

at least two scanning probes, each probe supported by cantilever to an atomic force microscope (AFM);

control means in each AFM adapted to receive motion control signals;

means for generating a first motion control signal for a first one of the AFMs for motion in a first direction;

means for generating a second motion control signal for the first one of the AFMs for motion in a second direction;

means for determining a first offset motion control signal responsive to the first motion control signal for a second one of the AFMs for motion in spaced relation to the first one of the AFMs in the first direction;

means for determining a second offset motion control signal responsive to the second motion control signal for the second one of the AFMs for motion in spaced relation to the first one of the AFMs in the second direction; and, means for generating image scan data from input signals from each probe.

2. A scanning probe microscopy system as defined in claim 1 further comprising feedback means from each probe to the respective control means for adjustment of the associated motion control signals.

3. A scanning probe microscopy system as defined in claim 1 wherein the means for determining a first offset motion control signal and the means for determining a second offset motion control signal comprises a rotational matrix.

4. A scanning probe microscopy system as defined in claim 1 wherein each probe and the respective cantilever are oriented for placement of a tip of the probe distal the AFM.

5. A scanning probe microscopy system as defined in claim 1 wherein a cantilever deflection signal is monitored and said cantilever deflection signal comprises the input signal from each probe to the scan image generation means.

6. A scanning probe microscopy system as defined in claim 1 wherein a cantilever deflection signal is monitored and said cantilever deflection signal provides feedback to the AEM for constant force scanning.

7. A method for scanning probe microscopy comprising the steps of:

attaching a first cantilever supported probe to a first AFM;

attaching a second cantilever supported probe to a second AFM;

determining a first directional pattern for the first probe;

determining a second direction pattern for the first probe;

calculating a first control signal corresponding to the first directional pattern;

calculating a second control signal corresponding to the second directional pattern;

determining a relative position of the second probe and AFM to the first probe and AFM;

calculating a first offset control signal based on the first control signal and the relative position of motion of the second probe in spaced relation to the first probe in the first directional pattern;

calculating a second offset control signal based on the second control signal and the relative position of motion of the second probe in spaced relation to the first probe in the second directional pattern; and, simultaneously supplying the first and second control signals to the first AFM and the first and second offset controls to the second AFM; and, generating image scan data from input from the probes.

8. A method for scanning probe microscopy as defined in claim 7 further comprising the steps of:

providing feedback for position of the first probe;

modifying the first and second control signals responsive to the feedback;

providing second feedback for position of the second probe; and, modifying the first and second offset control signals responsive to the second feedback.

9. A method for scanning probe microscopy as defined in claim 7 wherein the step of attaching a first cantilever supported probe further comprises the initial step of attaching a first probe and cantilever at an angle for maximum spacing of the first probe tip from the first AFM and the step of attaching a second cantilever supported probe further comprises the initial step of attaching a second probe and cantilever at an angle for maximum spacing of the second probe tip from the second AFM.

10. A method for scanning probe microscopy as defined in claim 7 further comprising the steps of:

monitoring a cantilever deflection signal for each probe; and, providing the cantilever deflection signal for generation of the image data.

11. A method for scanning probe microscopy as defined in claim 7 further comprising the steps of:

monitoring a cantilever deflection signal for each probe; and, providing the cantilever deflection signal as feedback to the AFM for the probe for constant force scanning.

12. A method for scanning probe microscopy as defined in claim 7 further comprising the steps of:

selecting a location for probing from the generated image scan data; and, driving at least one probe tip to the selected location.

13. A method for scanning probe microscopy as defined in claim 12 wherein the step of selecting a location includes the step of selecting a probe button.

14. A method for scanning probe microscopy as defined in claim 12 wherein the step of driving comprises the steps of calculating and outputting a waveform to drive the AFM associated with the at least one probe tip.

15. A method for scanning probe microscopy as defined in claim 14 wherein a second probe tip is driven based on the selected location and the step of driving further comprises the step of sharing common clocks and synchronization pulse to drive the first AFM for the first probe tip and the second AFM for the second probe tip.

* * * * *